United States Patent [19]

Miki et al.

[11] Patent Number: 4,940,275

[45] Date of Patent: Jul. 10, 1990

[54] APPARATUS FOR SCANNING RECORDING MEDIA WITH AN AUTOMATIC MEDIUM-CHANGE MECHANISM AND STRUCTURE FOR MOUNTING SAME ON A VEHICLE

[75] Inventors: Hiroyuki Miki; Yasushi Kawakami, both of Kanagawa, Japan

[73] Assignee: Nissan Motor Company, Limited, Yokohama, Japan

[21] Appl. No.: 244,636

[22] Filed: Sep. 12, 1988

Related U.S. Application Data

[63] Continuation of Ser. No. 891,322, Jul. 31, 1986, abandoned.

[30] Foreign Application Priority Data

Aug. 10, 1985 [JP] Japan ................................ 60-176142
Aug. 12, 1985 [JP] Japan ................................ 60-175932

[51] Int. Cl.$^5$ ........................ B60R 11/02; G11B 15/68
[52] U.S. Cl. .................................... 296/37.8; 224/273; 360/92
[58] Field of Search .................. 296/37.1, 37.8, 37.12, 296/37.14, 37.15; 224/42.42, 273; 360/92

[56] References Cited

U.S. PATENT DOCUMENTS

| 3,606,447 | 9/1971 | Ryding | 296/37.12 |
|---|---|---|---|
| 3,658,193 | 4/1972 | Gross | 360/92 X |
| 4,087,126 | 5/1978 | Wynn | 296/37.8 |
| 4,097,012 | 6/1978 | McIntyre | 224/42.42 X |
| 4,223,940 | 9/1980 | Janz et al. | 296/37.12 |
| 4,423,812 | 1/1984 | Sato | 296/37.12 X |
| 4,427,215 | 1/1984 | Weichenrieder et al. | 296/37.12 X |
| 4,488,669 | 12/1984 | Waters | 312/DIG. 33 X |
| 4,529,852 | 7/1985 | Lewandowski | 200/61.62 X |
| 4,552,399 | 11/1985 | Atarashi | 296/37.12 |
| 4,622,610 | 11/1986 | Makigawa | 360/92 |
| 4,630,160 | 12/1986 | Murayama | 296/37.1 X |
| 4,640,542 | 2/1987 | Watjer et al. | 296/37.8 |
| 4,777,547 | 10/1988 | Kikuchi | 360/92 |

FOREIGN PATENT DOCUMENTS

| 169113 | 1/1986 | European Pat. Off. | 224/273 |
|---|---|---|---|
| 3245394 | 6/1984 | Fed. Rep. of Germany | 224/273 |
| 2549786 | 2/1985 | France | 224/273 |
| 59036 | 5/1980 | Japan | 224/273 |
| 43044 | 4/1981 | Japan | 224/273 |
| 164821 | 10/1982 | Japan | 224/42.42 |
| 180339 | 10/1983 | Japan | 296/37.8 |
| 84643 | 5/1984 | Japan | 224/273 |
| 106340 | 6/1984 | Japan | 224/273 |
| 59-27301 | 8/1984 | Japan . | |

*Primary Examiner*—Dennis H. Pedder
*Attorney, Agent, or Firm*—Foley & Lardner, Schwartz, Jeffery, Schwaab, Mack, Blumenthal & Evans

[57] ABSTRACT

An apparatus for scanning recording media (a cassette tape deck) with an automatic medium-change mechanism (automatic cassette tape change mechanism) and a novel structure for mounting same in a vehicle are disclosed. The apparatus is installed in the vehicle body, specifically on a floor console located between the left- and right-hand seats and behind the shift lever of the vehicle transmission to leave the forward field of vision clear and to facilitate operation of the cassette tape deck.

8 Claims, 8 Drawing Sheets

APPARATUS FOR SCANNING RECORDING MEDIA WITH AN AUTOMATIC MEDIUM-CHANGE MECHANISM AND STRUCTURE FOR MOUNTING SAME ON A VEHICLE

This application is a continuation of application Ser. No. 891,322, filed July 31, 1986 abandoned.

BACKGROUND OF THE INVENTION

1. Field of the Invention

The present invention relates generally to an apparatus for scanning recording media with an automatic medium-change mechanism and a structure for mounting same in a vehicle.

2. Description of the Prior Art

A conventional structure for mounting an apparatus for scanning recording media (hereinafter referred to as a cassette deck) in a vehicle is exemplified by Japanese patent application Examined Open No. Sho. 59-27301.

FIG. 1 shows the conventional structure disclosed in the above-identified Japanese Patent document. As shown in FIG. 1, the cassette deck 101 is housed in the instrument panel 103 of the vehicle body.

However, other vehicle parts such as an air conditioning unit need also be disposed within the limited space of the panel 103 and there is a strict limitation on the height of the upper edge of the instrument panel 103 due to the need to leave the forward field of vision of the driver clear. Hence, it is impossible to install an ; apparatus requiring a vertical clearance for a number of housed cassette tapes, e.g., an automatic recording medium-changeable cassette deck (product name is AUTO CHANGER CASSETTE STEREO) within the vehicle body, i.e., within the instrument panel 103. The cassette deck described above can continuously play back music recorded on a plurality of cassette tapes housed within a cassette magazine (cassette housing).

SUMMARY OF THE INVENTION

With the above described problem in mind, it is a main object of the present invention to provide a structure for mounting the above-described apparatus for scanning recording media tape deck and the automatic medium change mechanism (automatic cassette tape-change mechanism) in the vehicle.

This can be achieved by the structure comprising: (a) a cassette tape deck which is capable of continuously playing back a plurality of cassette tapes, and (b) means for housing the cassette tape deck in a portion of vehicle body other than an instrument panel of the vehicle body.

BRIEF DESCRIPTION OF THE DRAWINGS

A more complete understanding of the present invention may be obtained from the following detailed description taken in conjunction with the attached drawings in which.

DETAILED DESCRIPTION OF THE PREFERRED EMBODIMENTS

Reference will hereinafter be made to the drawings in order to facilitate understanding of the present invention.

Figure 1:
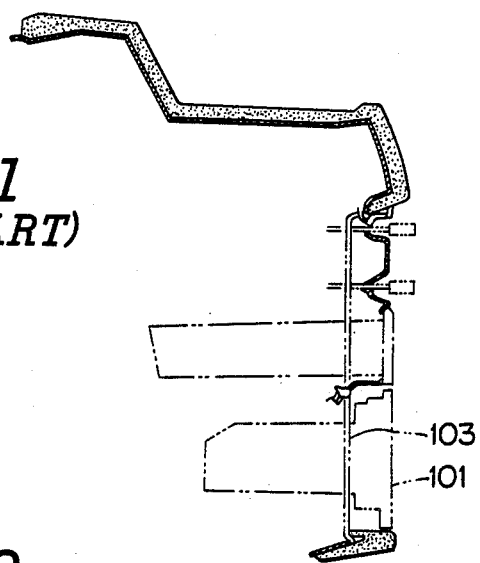
FIG. 1 shows a conventional structure for mounting a vehicular cassette tape deck in an instrument panel as disclosed in a Japanese Patent Utility Model Registration Examined Open No. Sho. 59-27301.
Figure 2:
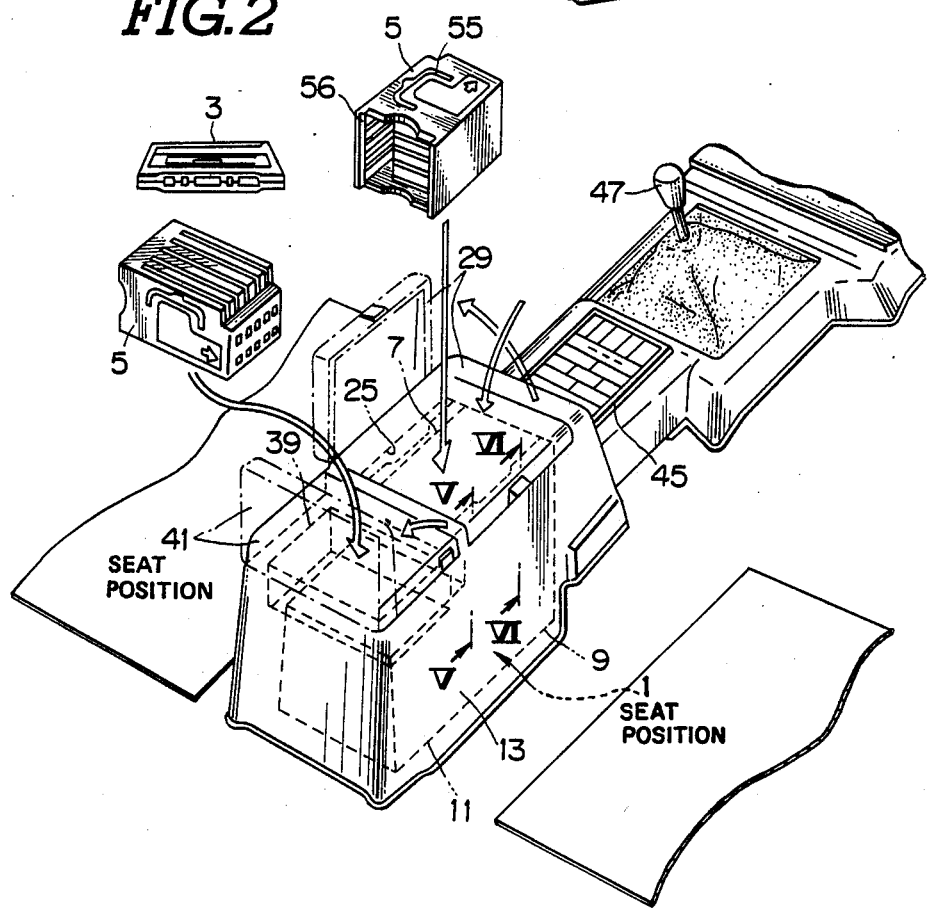
FIG. 2 is a perspective view of the whole structure for mounting an apparatus for scanning recording media in a vehicle.
Figure 3:
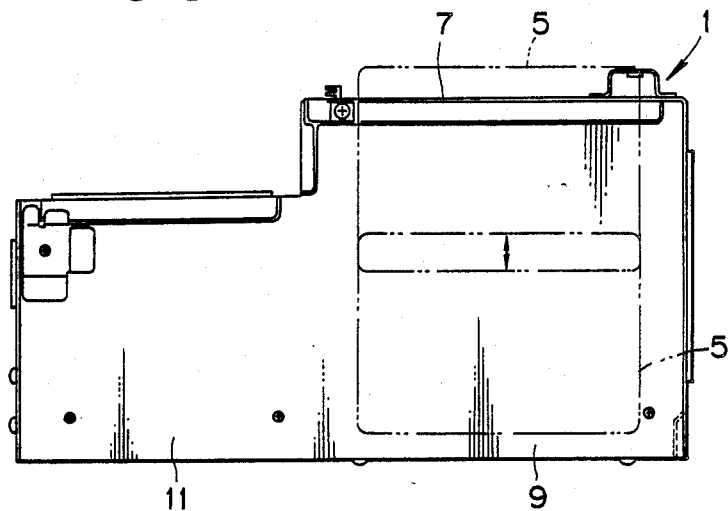
FIG. 3 is a side view of the apparatus shown in FIG. 2 mounted in the vehicle.

FIGS. 2 and 3 show an apparatus for scanning recording media with an automatic medium-change mechanism (hereinafter simply referred to as "auto-changer cassette deck"). The auto-changer cassette deck 1 is capable of continuously playing back music recorded on a plurality of cassette tapes 3, e.g., five. The auto-changer cassette deck 1 comprises: an inlet 7 for insertion of a magazine 5 housing the cassette tapes 3; an elevator 9 for automatically lowering the magazine 5 to a height at which a selected cassette tape 3 is in the proper position for play-back; and a deck portion 11 for playing back the recorded music on the selected cassette tape 3. The automatic continuous playback will be described in detail later.

Figure 4:
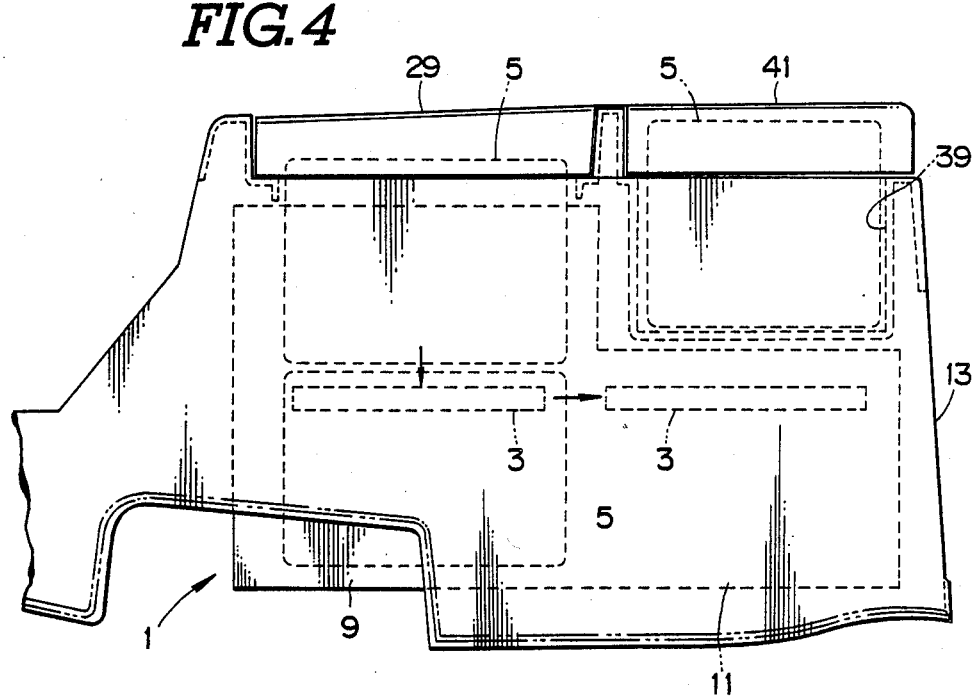
FIG. 4 is also a side view of the apparatus of FIG. 3.
Figure 5:
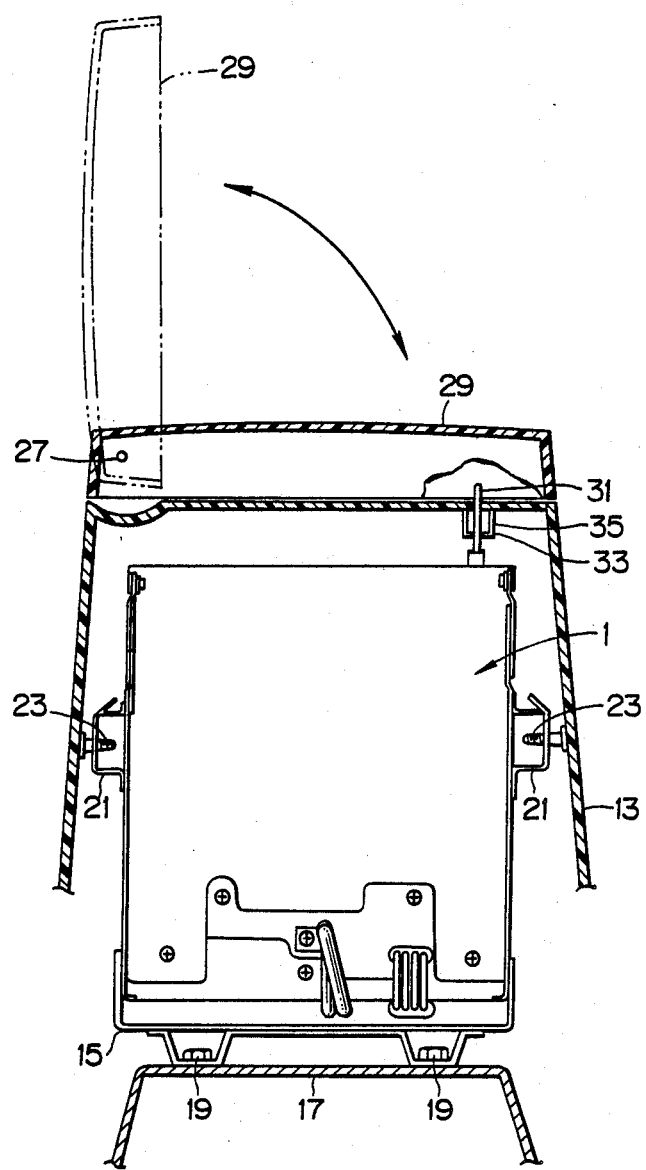
FIG. 5 is a cross-section taken along the line V—V in FIG. 2.

As shown in FIGS. 4 and 5, the auto-changer cassette deck 1 is disposed within a floor console (also called center console) 13 disposed between left and right seats (not shown) and is fixed by means of fasteners 19 such as bolts to the vehicle floor 17.

The above-described floor console 13 is fixed to brackets 21 provided on both side walls of the cassette deck 1, as shown in FIG. 5.

Figure 6:
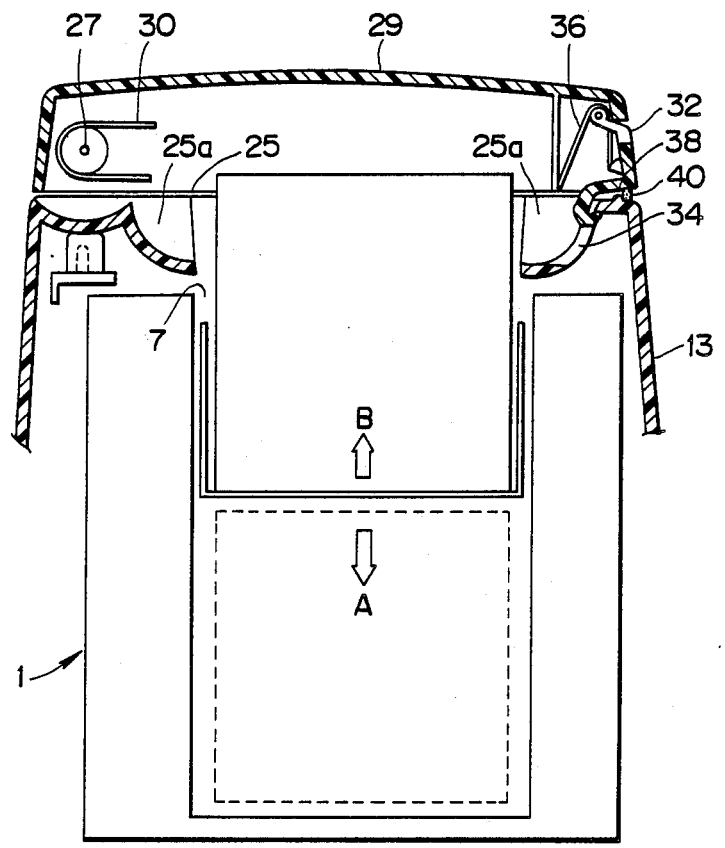
FIG. 6 is a cross-section taken along the line VI—VI in FIG. 2.
Figure 7:
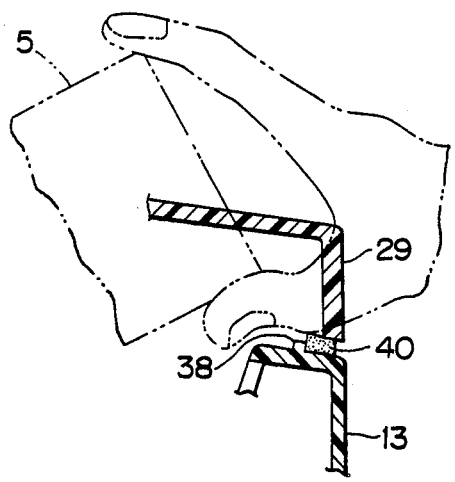
FIG. 7 is an enlarged cross-section through a rubber seal shown in FIGS. 2 through 6.
Figure 8:
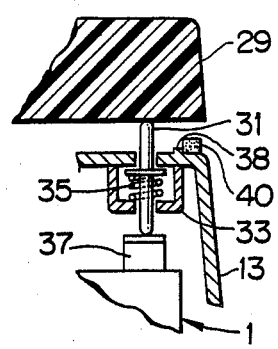
FIG. 8 is an enlarged cross-section through a switch shown in FIGS. 2 through 6.

The upper intermediate part of the floor console 13 is provided with an upper opening 25 corresponding to the inlet 7 of the elevator 9 of the cassette deck 1 as shown in FIG. 2. A recess 25a is formed in the edges of the upper opening 25 near its longitudinal center, as shown in FIG. 6, so as to facilitate grasping and lifting of the magazine 5. The upper opening 25 can be opened or closed by means of a front lid 29 which is free to pivot about a supporting axle 27 aligned with the axis of the vehicle. The front lid 29 is biased toward closure by means of a spring 30. A pivotable lock pawl 32 on the front lid 29 opposes the recess 25a. The lock pawl 32 detachably engages a hole 34 in the recess 25a. The lock pawl 32 is biased toward engagement by means of a spring 36. In addition, a rubber seal 40 encircles the upper opening 25 of the floor console 13 and is retained by means of a rib 38, as shown in FIG. 7, so as to hermetically seal the inlet 7 when the front lid 29 is closed. A plunger 31 is mounted in the top by means of a supporting member 33 of the floor console 13 so as to be free to move up and down, as shown in FIG. 8. A spring 35 biases the plunger 31 upwards. When the front lid 29 is closed, the plunger 31 is depressed against the biasing force of the spring 35 to close a switch 37 in the cassette deck 1.

A housing 39 provides room for a spare magazine 5, as shown in FIGS. 2 and 4, in the top of the deck portion 11 of the cassette deck 1. The housing 39 is covered by a pivotable rear lid 41 as shown in FIG. 2. The rear lid 41 detachably engages the upper edge of the floor console 13 by means of lock means similar to the lock pawl 32, hole 34, and spring 36 of the front lid 29. In addition, in FIG. 2, numeral 45 denotes a keyboard operation panel for the cassette deck 1 and numeral 47 denotes a shift lever of a vehicle transmission (in FIG. 2, a manual transmission).

A plurality of cassette tapes 3 are to be loaded into the magazine 5, which will be described later. With the front lid 29 open to the position denoted by phantom lines in FIG. 5, the magazine 5 is inserted through the inlet 7 of the cassette deck 1 and the upper opening 25. After the front lid 29 is again closed, the lock pawl 32 is pressed into the hole 34 against the biasing force of the spring 36. Since the front lid 29 is in contact with the seal rubber member 40, a hermetical seal is secured to prevent introduction of dust via the inlet 7. Simultaneously, the plunger 31 is depressed by the front lid 29 so that the switch 37 of the cassette deck 1 is closed. The magazine 5 is then automatically lowered using the elevator 9 as denoted by the arrow A in FIG. 6 to a height suitable for playback. Upon completion of the insertion operation described above, playback can be initiated through operation of the keyboard operation panel 45.

When removing the magazine 5, the front lid 29 is opened by the steps described above. When the switch 37 is opened, the magazine 5 is automatically raised as denoted by the arrow B shown in FIG. 6. Once the magazine 5 projects out of the upper opening 25, it can be grasped and removed from the housing 13. The magazine 5 can easily be grasped by inserting one's fingers into the recess 25a.

In addition, a back-up magazine 5 can be housed within a housing 39 built into the floor console 13. The lock means can be released in the same way as the front lid 29 to open or close the rear lid 41.

The feed mechanism is used to feed the cassette tape positioned opposite the inlet of the cassette deck 1 into the deck 1 and conversely to return the cassette tape from the deck main frame into the magazine.

Figure 9:
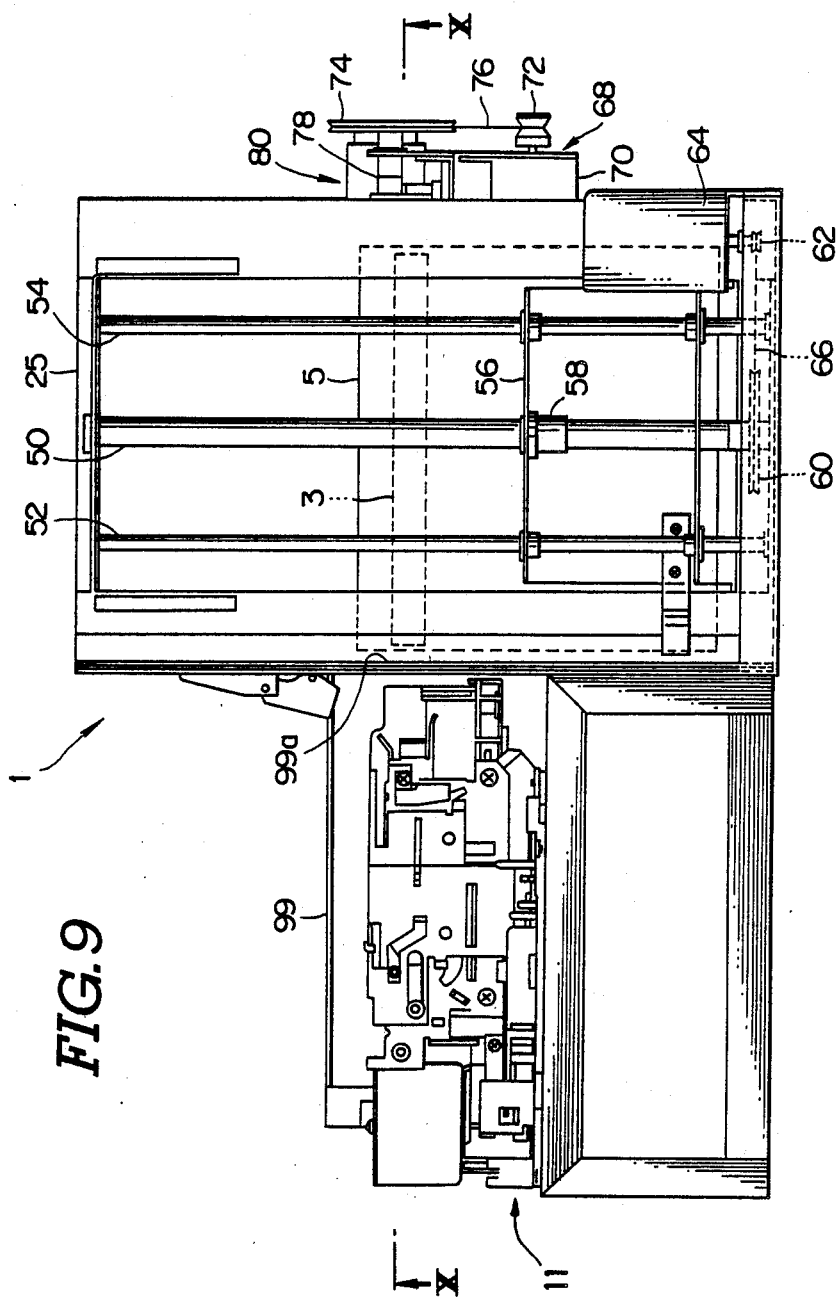
FIG. 9 is an elevation of the recording media scanning apparatus mounted in the vehicle.

FIG. 9 is elevation of the auto changer cassette tape deck 1. As shown in FIG. 9, the right side of the main frame 99 of the deck 1 includes the magazine housing (also referred to as the elevator) 9 into which the magazine 5 is inserted through the upper opening 25.

Figure 12:
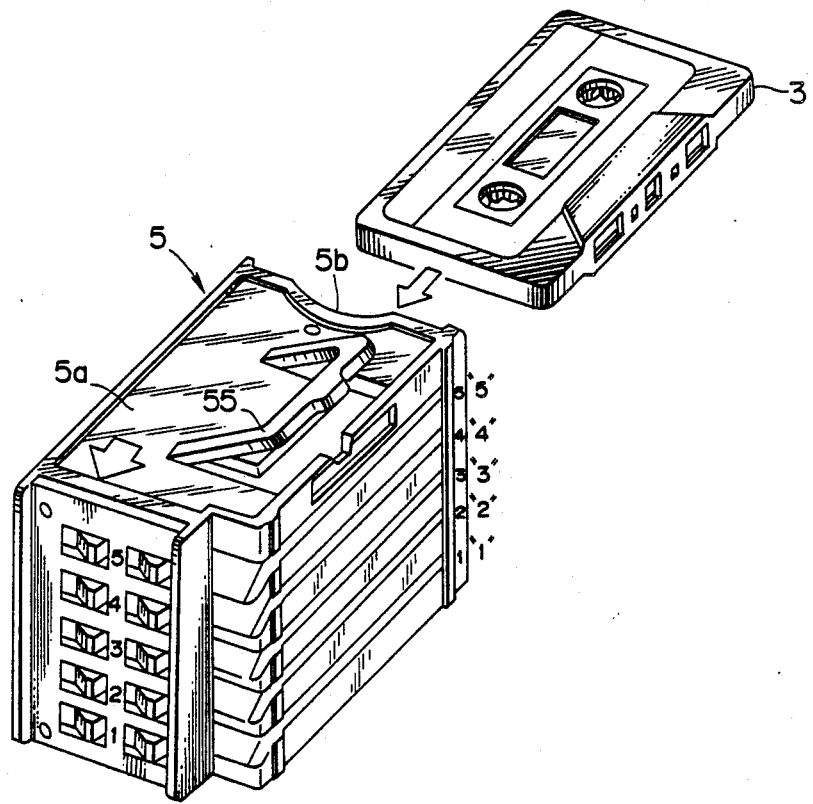
FIG. 12 is a perspective view of a magazine into which cassette tapes are loaded.

FIG. 12 is a perspective view of the magazine 5 and a cassette tape 3. The magazine 5 has space for five cassette tapes 3 stacked vertically. The five cassette tapes are numbered 1 through 5 starting from the lowermost. A handle 55 is built into the upper surface 5a of the magazine 5 and is pivotable so as to lie flush with the upper surface 5a when the magazine 5 is housed in the magazine, housing 9. The deck main frame 99 is located behind the magazine housing 9.

Returning to FIG. 9, a center shaft 50 is screw-threaded and extends vertically through the center of the magazine housing 9. Guide shafts 52 and 54 are disposed to either side of the center shaft 50. A magazine support 56 with a nut 58 screwed onto the center shaft 50 is free to move vertically along the center shaft 50 with the aid of guide shafts 52, 54.

A pulley 60 is mounted on the lower end of the center shaft 50 and is linked with a drive pulley 62 fixed to the rotor of a motor 64 attached on a lower right side of the magazine housing portion 9 via a belt 66. When the motor 64 is driven, the magazine support 56 moves upwards or downwards (is raised or lowered) until a selected one of the cassette tapes within the magazine 5 opposes the inlet 99a to the deck main frame 99.

A drive element 68 is mounted on the right side of the magazine housing 9 distal from the deck main frame 99. The drive element 68 constitutes the feed mechanism which feeds the selected cassette tape into the deck main frame 99 and returns the cassette tape from the deck main frame 99 to its original position in the magazine 5. The drive element 68 has a motor 70 with a drive pulley 72 linked to a secondary pulley 74 via a belt 76. The secondary pulley 74 is mounted on the right-hand end of a main shaft 78 extending left and right and free to rotate with respect to the magazine housing 9.

Figure 10:
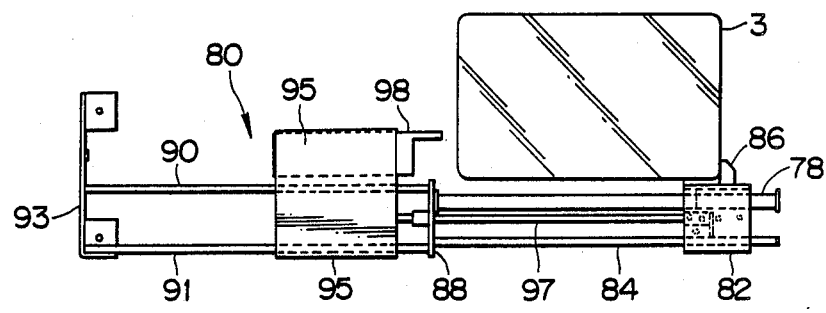
FIG. 10 is a bottom view of a feed mechanism viewed along the line X—X of FIG. 9.

FIG. 10 shows the feed mechanism denoted by 80 as viewed along the line X—X of FIG. 9. The main shaft 78 is threaded and a nut (feed member) 82 is screwed thereonto so as to move right and left with the aid of a horizontal guide shaft 84. A pawl 86 projects from one side of the feed member 82 so as to drive the cassette tape 3 to the left, i.e., toward deck main frame 99. The cassette tape 3 thus conveyed to the deck main frame 99 is thereafter loaded into the deck main frame 99 by an automatic induction mechanism built into the deck main frame 99. The left-hand ends of both the main shaft 78 and the guide shaft 84 are supported by a center supporting plate 88 and two parallel guide shafts 90, 91 extend between the supporting plate 88 and a side plate 93 located to the left of the supporting plate 88. The guide shafts 90, 91 similarly support a feed member 95 movable to the left and right. The feed member 95 conveys the cassette tape 3 back to the magazine 5 after an automatic ejection mechanism built into the deck main frame 99 is operated. In this case, the motor 70 is rotated in reverse. A push lever 98 projecting from one side of the feed member 95 abuts the cassette tape 3 so as to drive it back toward the magazine 5.

A movable shaft 97 penetrates the center supporting plate 88 and is free to shift left and right. One end of the movable shaft 97 is fixed to the above-described feed member 82. The shaft 97 serves to hold the feed members 82, 95 at least a fixed distance apart so as to accommodate the cassette 3.

Figure 11:
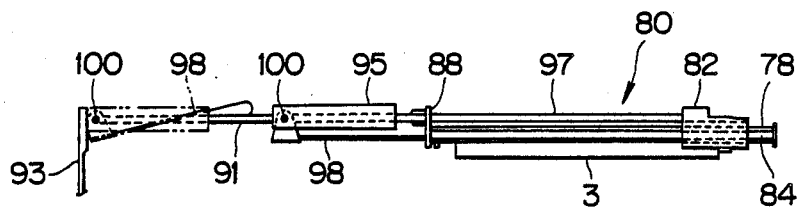
FIG. 11 is a side view of the feed mechanism shown in FIG. 10.

FIG. 11 is a side view of the feed mechanism 80 shown in FIG. 10. As shown in FIG. 11, the push lever 98 is pivotably urged about a pin 100 out of the plane of travel of the cassette tape 3 as denoted in phantom line in FIG. 11 before the automatic induction mechanism of the deck main frame 99 is actuated. When the push lever 98 is being used to return the cassette tape to the magazine 5, it pivots about the pin 100 to the position denoted in solid line in FIG. 11.

In addition, since a spring (not shown) which biases the push lever 98 in a counterclockwise direction as viewed from FIG. 11 is installed on the pin 100, a pivotal movement of the push lever 98 in the counterclockwise direction is carried out when the guide pin installed on the push lever 98 is guided on the guide rail to enter a deformed portion of the guide rail. In the same way, the pivotal movement in a clockwise direction is carried out when the guide pin is drawn out from the deformed portion of the guide rail.

Figure 13:
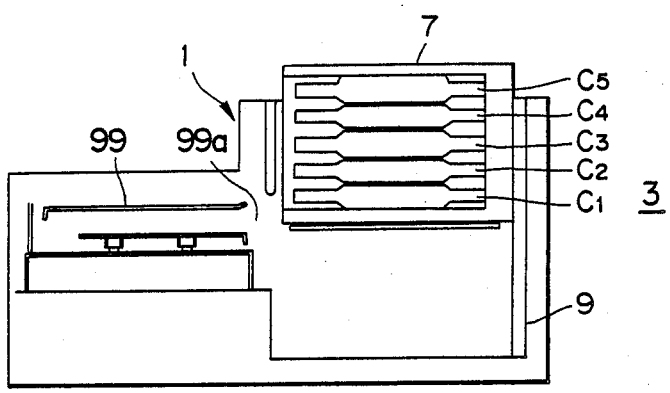
FIGS. 13 through 16 help explain the action of insertion of the magazine into the apparatus shown in FIG. 2.

FIGS. 13 to 16 illustrate the auto-change feature of the tape deck. FIG. 13 shows a loaded magazine 5 inserted in the opening 25 of the magazine housing 9, but not yet fully deployed.

When the lid 29 of the center console 13 is closed and one of the five cassette tapes $C_1$ through $C_5$ is selected through the operation panel 45 located between the deck main frame 99 and shift lever 47 of the vehicle transmission, the motor 64 is actuated so that the magazine 5 is lowered from the standby position shown in FIG. 13.

Figure 14:
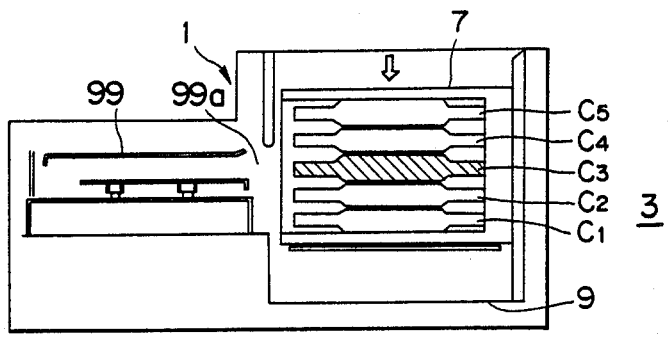

If, e.g., the operator has selected cassette tape number "3", then the cassette tape $C_3$ shaded by oblique lines in FIG. 14 (which is assigned the number "3") is lowered to a position facing the inlet 99a to the deck main frame 99. The motor 64 then stops, so that the magazine 5 stops at that height.

The feed member 82 moves to the left as viewed in FIG. 10 when the motor 70 is actuated so that the selected cassette tape $C_3$ of the tapes wholly denoted by 3 is conveyed to the deck main frame 99. At this time, the feed member 95 is moved in the same direction together with the feed member 82 and push lever 98 is pivoted out of the plane of the travel of the selected cassette tape to the position denoted by the phantom line in FIG. 11 before activation of the automatic induction mechanism of the deck main frame 99 so as not to obstruct the movement of the selected cassette tape (in this case $C_3$).

Figure 15:
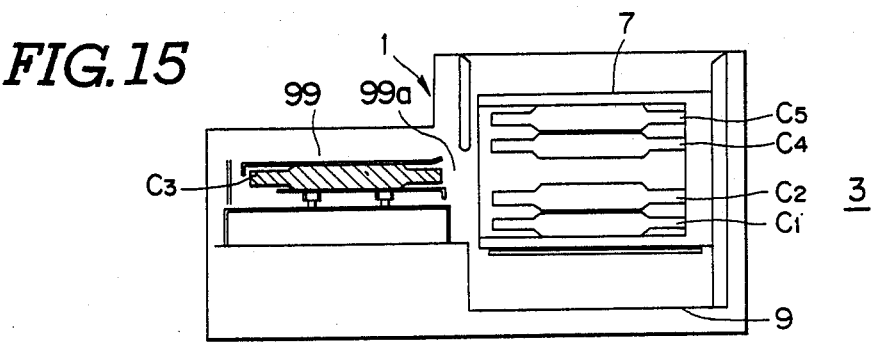
Figure 16:
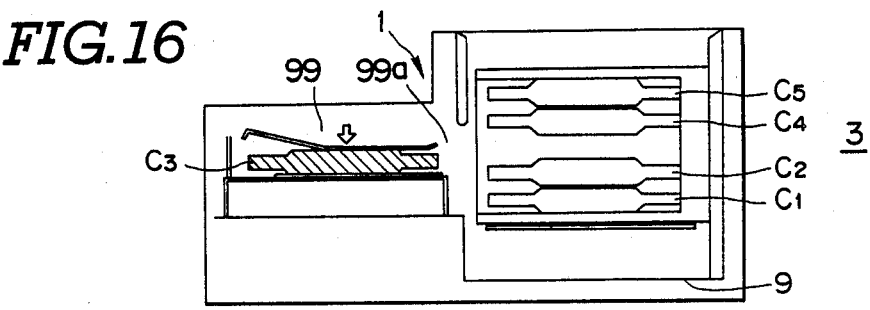

In this way, as shown in FIG. 15, the selected cassette tape is inserted into the deck main frame 99.

Following play-back, the automatic ejection mechanism in the deck main frame 99 is activated so that the cassette tape is ejected back toward the magazine 5. The motor 70 is then rotated in the reverse direction so that the cassette tape is returned to its original position within the magazine 5. Then the motor 70 stops.

Thereafter, unless the operator operates the operation panel 45 to turn the deck 1 off, the motor 64 is again actuated to lower the magazine 5 and to select the subsequently-numbered (in this case, number "4" denoted by $C_4$) cassette tape. Then, the same sequence of operations as were performed for tape number "3" is repeated. This sequence of operations can be repeated from the tape number "1" denoted by $C_1$ to tape number "5" denoted by $C_5$. In addition, if the operator selects a desired numbered tape among the five cassette tapes through the operation panel, the deck main frame can immediately reproduce the desired cassette tape.

It will clearly be appreciated by those skilled in the art that the foregoing description is made in terms of the preferred embodiment and various modifications can be made without departing from the scope of the present invention which is to be defined by the appended claims.

What is claimed is:

1. A cassette tape deck mounting structure for the passenger compartment of an automotive vehicle of the type having front seats, a floor mounted shift lever and an inner roof surface, comprising:
    (a) a cassette tape deck having an automatic cassette tape change mechanism for continuously playing back a plurality of cassette tapes and having an operation panel, said deck being located at an intermediate position between said front seats and rearwardly of said shift lever, and
    (b) floor console means for housing said cassette tape deck, said console means having a box-shaped housing extending horizontally between said front seats and along a side of each of said front seats, said housing having an upper surface facing toward said roof surface, and said operation panel being accessible from said upper surface.

2. The structure according to claim 1, wherein said floor console means includes first bracket means attached to a bottom portion of said cassette tape deck, said first bracket means being attached to a floor panel of said vehicle located below said floor console means.

3. The structure according to claim 2, wherein said floor console means includes second and third bracket means, respectively, attached to each side wall of said cassette deck, said second and third bracket means extending vertically with respect to the bottom portion of said deck, said second and third bracket means being respectively attached to each side wall of said floor console means.

4. The structure according to claim 1, wherein a front upper part of said floor console means is provided with an upper opening facing an insertion inlet of said cassette tape deck, said upper opening having a recess at each edge along forward and rearward directions of said console means for facilitating extraction of a cassette magazine from said insertion inlet, said cassette magazine being capable of stacking a plurality of cassette tapes, said structure further having a front lid provided on a side wall of said floor console means so as to cover and uncover said upper opening of said floor console means, said front lid including a supporting axle pivotally supported adjacent said upper opening and being biased toward a covering position.

5. The structure according to claim 4, where a lock pawl is rotatably supported on said front lid at a position opposite one of said recesses for detachably engaging a hole formed on said one recess, and is biased so as to engage with said hole by means of spring means wound on said lock pawl.

6. The structure according to claim 5, further including a rubber seal member positioned on a periphery of said upper opening of said floor console means by means of a rib so as to provide a seal structure for said floor console means when said front lid is closed.

7. The structure according to claim 6, further including a switch knob member provided adjacent an open end of said front lid attached on an upper end of said floor console means adjacent to said rubber seal member, said switch knob member being movable along a vertical direction with respect to said floor console means by means of a supporting member and a spring member, so that when said front lid is closed to cover said upper opening of said floor console means, said front lid causes said switch knob member to move downward against the biasing force of said spring member to turn on a power switch of said cassette tape deck.

8. The structure according to claim 4, wherein a rear upper part of said floor console means is provided with a second upper opening for guiding another cassette magazine into said housing for said cassette deck and a rear lid is provided pivotally on a rear wall of said floor console means so as to cover and uncover said second upper opening of said floor console means.

* * * * *